(12) United States Patent
Russell et al.

(10) Patent No.: US 8,743,284 B2
(45) Date of Patent: Jun. 3, 2014

(54) SYNCHRONIZING REMOTE AUDIO WITH FIXED VIDEO

(75) Inventors: Michael E. Russell, Palatine, IL (US); Arnold Sheynman, Northbrook, IL (US)

(73) Assignee: Motorola Mobility LLC, Chicago, IL (US)

( * ) Notice: Subject to any disclaimer, the term of this patent is extended or adjusted under 35 U.S.C. 154(b) by 1165 days.

(21) Appl. No.: 11/868,643

(22) Filed: Oct. 8, 2007

(65) Prior Publication Data

US 2009/0091655 A1 Apr. 9, 2009

(51) Int. Cl.
*H04N 9/475* (2006.01)

(52) U.S. Cl.
USPC .......................................................... 348/515

(58) Field of Classification Search
USPC ............... 348/515; 370/389, 347; 340/825.44
See application file for complete search history.

(56) References Cited

U.S. PATENT DOCUMENTS

| | | | |
|---|---|---|---|
| 5,696,500 A | 12/1997 | Diem | |
| 6,163,646 A * | 12/2000 | Tanaka et al. | 386/201 |
| 6,356,312 B1 | 3/2002 | Lyu | |
| 6,452,974 B1 | 9/2002 | Menon et al. | |
| 6,907,028 B2 | 6/2005 | Laiho et al. | |
| 2001/0008535 A1 | 7/2001 | Lanigan | |
| 2003/0174202 A1* | 9/2003 | Eshkoli et al. | 348/14.08 |
| 2005/0100014 A1* | 5/2005 | Brown et al. | 370/389 |
| 2005/0101319 A1 | 5/2005 | Murali et al. | |
| 2005/0130585 A1* | 6/2005 | Gnuschke et al. | 455/3.06 |
| 2005/0237378 A1* | 10/2005 | Rodman | 348/14.09 |
| 2005/0281255 A1* | 12/2005 | Davies et al. | 370/389 |
| 2006/0036758 A1* | 2/2006 | Zhodzishsky et al. | 709/233 |
| 2006/0209210 A1 | 9/2006 | Swan et al. | |
| 2007/0024746 A1 | 2/2007 | Cole | |

FOREIGN PATENT DOCUMENTS

| | | |
|---|---|---|
| EP | 1071294 A2 | 1/2001 |
| EP | 1067773 B1 | 9/2006 |
| RU | 2154357 C2 | 8/2000 |
| RU | 2217876 C2 | 11/2003 |
| RU | 2292657 C2 | 1/2007 |

OTHER PUBLICATIONS

Advanced Audio Distribution Profile Specifiction, Adopted Version 1.0, Bluetooth SIG, May 22, 2003.
Bluetooth 2004: Poised for the Mainstream, IN-STAT MDR, Apr. 2004.
El Homsi S et al.: "An Original Solution for Bluetooth Wireless Synchronous Communication dedicated to a Sensor and Actuators System", Proceedings of the 2004 IEEE International Symposium on Industrial Electronics, vol. 1, May 4, 2004, pp. 151-156, IEEE, Piscataway, NJ, US.

(Continued)

*Primary Examiner* — Nasser Goodarzi
*Assistant Examiner* — An Nguyen

(57) ABSTRACT

A multimedia device (100) including a separating entity configured to separate a multimedia stream into audio frames and video frames, a sequencing entity configured to add a sequence number to at least one audio frame, a transceiver configured to transmit audio frames to a remote audio device, a controller coupled to a video player, the controller configured to determine a delay associated with transmitting the audio frames to the remote audio device based upon the sequence number and to control the presentation of the video frames at the video player based on the delay.

19 Claims, 5 Drawing Sheets

(56) References Cited

OTHER PUBLICATIONS

Bluetooth SIG: "Specification of the Bluetooth System, Architecture & Terminology Overview; Acronyms * Abbreviations; Core System Package [Host volume], Logical Link Control and Adaptation Protocol Specification; Service Discovery Protocol (SDP); Generic Access Profile", Specifcation of the Bluetooth System, [Online] vol. 1 part A-B, vol. 3 part A-C, No. 2.1 + EDR, Jul. 26, 2007, Retrieved from the Internet: URL:http://www.bluetooth.com/SiteCollectionDocuments/Core_V21_EDR.zip>.

Bluetooth SIG: "Specification of the Bluetooth System, Profiles; Part K:6. Headset Profile", Specfication of the Bluetooth System, No. 1.1, Feb. 22, 2001, pp. 197-226.

Patent Cooperation Treaty, International Search Report and Written Opinion of the International Searching Authority for International Application No. PCT/US2008/078299, Sep. 30, 2008, 15 pages.

Russian Notice of Rejection for Russian Patent Application No. 2010118478 dated Apr. 20, 2012, 3 pages.

Federal Service on Industrial Property (ROSPATENT) for Russian Patent Application No. 2010118478 dated Oct. 2, 2013, 7 pages.

Second Office Action, for Russian Patent Application No. 2010118478/07(026231), Patent Office of the Russian Federation, Oct. 30, 2011, Translation, all pages.

Notification of First Office Action, for Chinese Patent Application No. 200880110762.x, issued by Chinese State Intellectual Property Office (SIPO), Nov. 9, 2011, all pages.

Notification of Second Office Action, for Chinese Patent Application No. 200880110762.x, issued by Chinese State Intellectual Property Office (SIPO), Jun. 20, 2012, all pages.

Notification of Third Office Action, for Chinese Patent Application No. 200880110762.x, issued by Chinese State Intellectual Property Office (SIPO), Jul. 15, 2013, all pages.

* cited by examiner

SYNCHRONIZING REMOTE AUDIO WITH FIXED VIDEO

FIELD OF THE DISCLOSURE

The present disclosure relates generally to wireless communications, and more specifically to synchronizing audio and videos signals played on separate devices, for example, on a handheld electronic device and a wireless headset.

BACKGROUND

Currently, many Bluetooth enabled mobile phones support a suite of basic functionality such as the Headset/Hands-Free profiles for enabling hands-free calling, certain OBEX functionality for pushing, pulling, and transferring files, and some type of serial connection for generic access. Most of these phones also support to some degree media content such as MP3 and other format audio clips. Some Bluetooth enabled phones also have the capability to play MP4 type media content, which combines video, audio, and metadata in the same file. However, audio and video synchronization problems may occur when video content is viewed on a cell phone display or other host device and the accompanying audio content is played on a wireless headset. For example, streaming stereo quality audio from a media device like a cell phone or personal computer via Bluetooth to a stereo headset requires the use of the Generic Audio Video Access Profile (GAVDP), Advanced Audio Distribution Profile (A2DP), and the Audio Video Distribution Transport Protocol (ADVTP). A2DP requires use of a sub-band coding (SBC) scheme to ensure interoperability between all Bluetooth devices. If music files are stored on a phone in MP3 format, they generally are transcoded to SBC in order to stream the audio using A2DP. The transcoding of the audio content and the transmission thereof to the wireless headset introduces latency that affects synchronization. Synchronization may also be affected by the re-transmission of data between the host device and the headset and by the subsequent processing of the audio content on the headset.

The various aspects, features and advantages of the disclosure will become more fully apparent to those having ordinary skill in the art upon careful consideration of the following Detailed Description thereof with the accompanying drawings described below. The drawings may have been simplified for clarity and are not necessarily drawn to scale.

DETAILED DESCRIPTION

Figure 1:
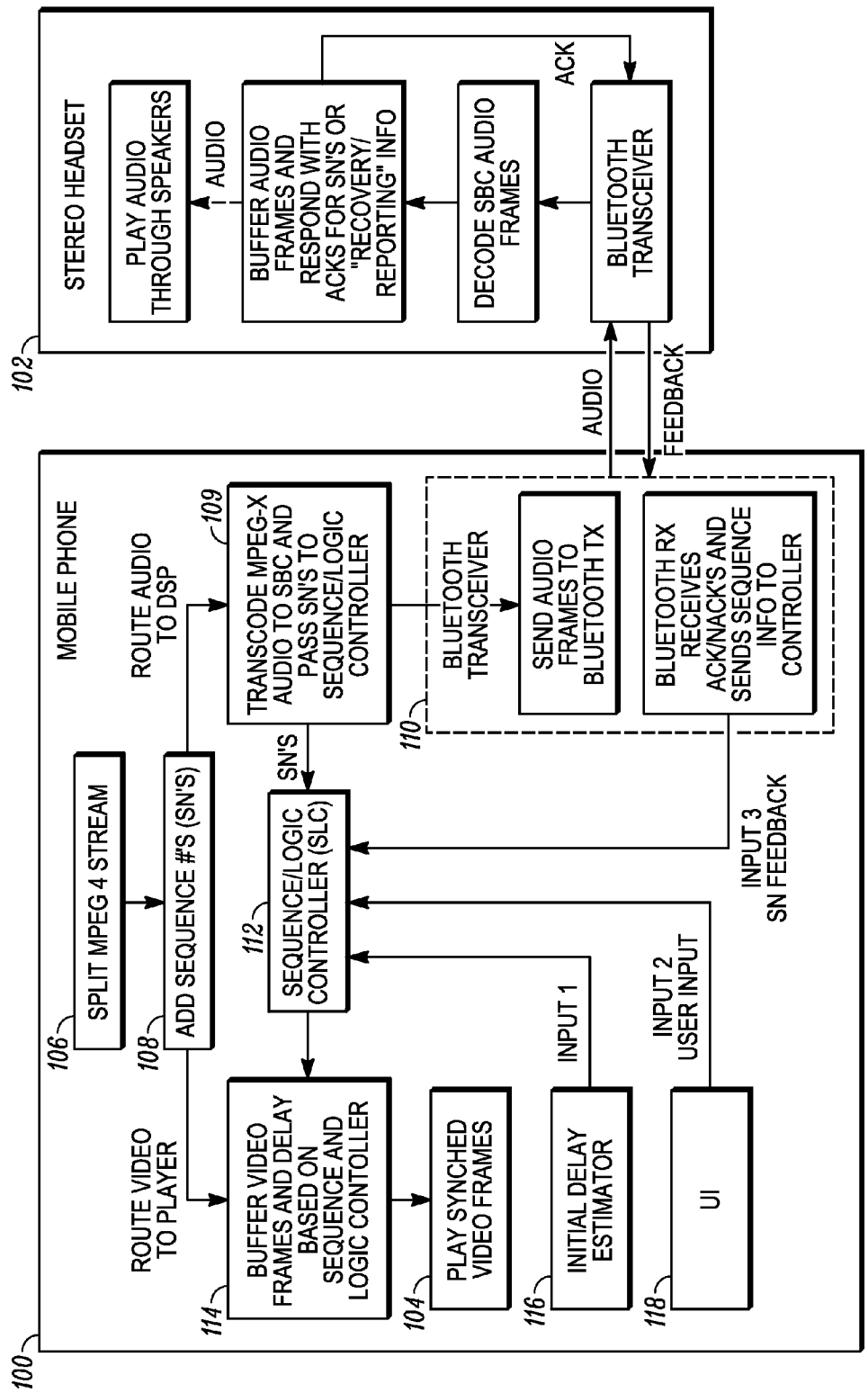
FIG. 1 is a schematic block diagram of a multimedia device and a remote audio device.

In FIG. 1 illustrates a handheld multimedia device 100 that is communicably coupled to a remote audio device 102 wherein video content is presented on the multimedia device and related audio content is presented on the remote audio device. The exemplary multimedia device is a mobile telephone including at least a video player capable of playing video content. More generally, however, the device 100 includes a multimedia player 104 capable of presenting audio and video content. In other embodiments, the multimedia device is any host device capable of presenting at least video content and communicating with a remote audio device capable of presenting the accompanying audio content. In one implementation, the multimedia device supports MP4 multimedia content or some other multimedia format content. MP4 is a container format that combines video, audio and metadata. The remote audio device 102 may be implemented as an audio headset or some other audio device capable of communicating with the host device. In one embodiment, the remote audio device communicates wirelessly with the host device, although in other embodiments, the devices communicate via wire-line. The remote audio device generally supports an audio format provided by the host device as discussed further below.

In one embodiment, the multimedia device wirelessly communicates with the remote audio device in compliance with the Bluetooth protocol. In other embodiments, however, these devices communicate pursuant to some other open or proprietary wireless or wire-line communication protocol. In some instances, synchronization problems may occur when the video component of the multimedia file is presented on a user interface of the multimedia device and the accompanying audio component is presented on the remote device. As suggested, propagation delay associated with the transmission of the audio component from the multimedia device to the remote audio device may result in an unacceptable lack of synchronization. The propagation delay may also be affected by the re-transmission of bad or lost data between the host device and the remote audio device. Propagation delay may also be affected by changing channel conditions, for example, in mobile applications where the host device communicates wirelessly with the remote audio device.

The local processing of audio content at the multimedia device and/or at the remote audio device may also adversely affect synchronization. In some implementations, for example, streaming stereo quality audio from a multimedia device via Bluetooth to a stereo headset requires the use of the Generic Audio Video Access Profile (GAVDP), Advanced Audio Distribution Profile (A2DP), and the Audio Video Distribution Transport Protocol (ADVTP). A2DP requires sub-band coding (SBC) to ensure interoperability between Bluetooth devices. Some audio file formats, for example, MP3, stored on the multimedia device are generally transcoded to SBC in order to use A2DP. In other embodiments, other audio and video protocols may be used. Transcodsing of the audio content on the host device for whatever reason nevertheless introduces latency that may have an adverse affects audio and video synchronization. Synchronization may also be affected by processing of the audio at the remote audio device.

In FIG. 1, the multimedia device includes a separating entity 106 coupled to the multimedia player. The separating entity is configured to separate a multimedia stream into audio frames and video frames. In one implementation, the multimedia content input to the separating entity is read from a storage device on the multimedia device. In other implementations, the multimedia content is streamed from a remote source. In the latter implementation, the multimedia content may be streamed over a wire-line or wireless network. The streamed content may originate from any source, for example, a DVB-H or other broadcast source, or it may be streamed from a content server connected to the Internet or over some other network. In other implementations, the multimedia content may be obtained from some other source, for example, from a recording device communicably coupled to the multimedia device. The disclosure is not intended to be limited to a particular multimedia content source.

In FIG. 1, the multimedia device 100 also includes a sequencing entity 108 having an input coupled to an output of the separating entity. In one embodiment, the sequencing entity 108 is configured to add a sequence number to at least one of the audio frames. In other embodiments, a sequence number is also added to at least one of the video frames. More generally, a sequence number may be added to every nth audio frame and to every nth video frame, where n is some integer value greater than 0. In some embodiments, the sequence numbers added to audio and video frames may be used to assess the synchronization between the audio and video frames during playback as discussed more fully below.

In FIG. 1, the video player 104 is coupled to the separating entity 106 wherein the video player is configured to present video frames received from the separating entity at a user interface of the device, for example, at a video display thereof. In FIG. 1, the video player 104 is coupled to the sequencing entity 108 wherein the sequencing entity communicates the video frames to the video player 104 via a buffer entity 114. In other implementations the video player is coupled directly to the separating entity 106 wherein the separating entity communicates the video frames to the video player via the buffer entity 114. In embodiments where the video frames are routed to the video player via the sequencing entity, the sequencing entity may or may not add sequence numbers to the video frames depending upon the particular implementation.

In some embodiments, the multimedia device includes a transcoding entity for implementations where transcoding may be necessary. In some instantiations, for example, audio file formats stored on the multimedia device may be transcoded to another format before transmission to the remote audio device. In some embodiments, noted above, MP3 format audio frames are transcoded to SBC in order to use A2DP. In other embodiments, the transcoder entity transcodes other audio formats. In FIG. 1, the exemplary host device includes a transcoding entity 109 for transcoding audio frames. The delay associated with transcoding on the host device and remote audio device is discussed further below.

In FIG. 1, the host device 100 comprises a transceiver 110 coupled to the sequencing entity 108. In one embodiment, the transceiver is a wireless transceiver, for example, a Bluetooth or some other protocol wireless transceiver. More generally however, the transceiver may be a wire-line transceiver. The transceiver is generally configured to transmit audio frames to the remote audio device. Upon receipt, the remote audio device presents the audio frames at a user interface thereof, for example, at an earpiece transducer. In some embodiments, the audio frames may be processed at the remote audio device before presentation to the user.

The video frames presented at the user interface of the host multimedia device are preferably synchronized with audio frames presented at the user interface of the remote audio device. In the instant disclosure, synchronization means that the presentation of the audio frames and the accompanying video frames occurs within a specified time interval. The specified time interval is subjective since sensitivity to synchronization may vary somewhat among users. The specified time interval is generally selected such that there is no appreciable user perceptible lack of synchronization for at least a majority of users. Any delay between the presentation of the video frames and accompanying audio frames outside the specified time interval is unsynchronized. According to one aspect of the present disclosure, the presentation of unsynchronized audio and video frames is reduced and preferably eliminated at least with respect to the subjectively specified time interval.

In FIG. 1, the multimedia device also includes a controller 112 coupled to the video player 104. The controller is configured generally to determine whether the video frames and accompanying audio frames are synchronized and also to control the presentation of the video and/or audio frames in a manner to reduce or eliminate a lack of synchronization. In one embodiment, the controller is configured to determine a delay associated with transmitting audio frames to the remote audio device based upon a sequence number added to one or more of the audio frames. The controller is also configured to control the presentation of the video frames at the video player based on the delay. In one embodiment, the controller delays the presentation of the video frames on the user interface of the multimedia device to synchronize the presentation of the audio frames at the remote device with the video frames at the host device.

In FIG. 1, the host device 100 includes a buffer and delay entity 114 coupled to the video player 104. In one embodiment the buffer and delay entity is part of the video player. In other embodiments, however, the buffer and delay entity 114 is separate. The controller 112 is coupled to the buffer and delay entity 114 and thus the controller is coupled to the video player 104 via the entity 114. In one embodiment, the controller 112 controls the presentation of the video frames based on the transmission delay by providing control signals to the buffer and delay entity 114, wherein the control signal delays the transfer of the video signals to the video player.

In one implementation, the controller determines the propagation delay by measuring a transmission time of the audio frames having the sequence number to the remote audio device. In the particular embodiment illustrated in FIG. 2, at 210, the controller selects an outgoing frame and initiates a delay timer at 220 before or at the time the selected audio frame is transmitted. The selected audio frame has a sequence number. In FIG. 1, the controller 112 is coupled to the transcoding entity 109. In one embodiment, the controller starts the timer upon obtaining the sequence number of the audio frame from the transcoding entity. Starting the timer before transcoding accounts for delay associated with transcoding on the host device. Alternatively, the timer could be initiated after transcoding, for example, upon transmission of the audio frame. Thus in some embodiments it may not be necessary to couple the controller to the transcoding entity. In some implementations, for example, the sequencing entity may transfer the audio frames directly to the controller whereupon the controller obtains the sequence number from the audio frame.

Figure 2:
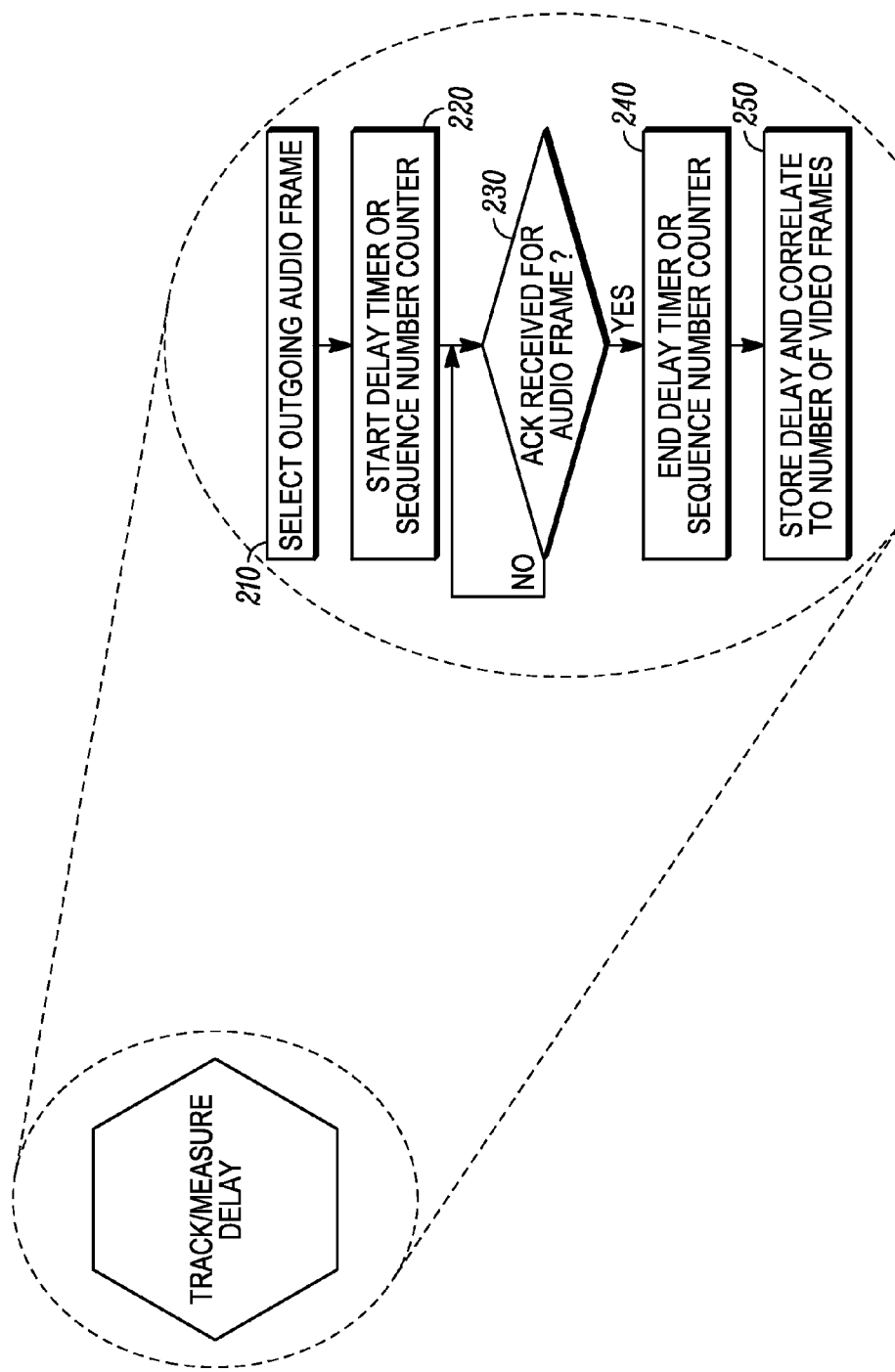
FIG. 2 is a process flow diagram for determining delay.

In FIG. 1, the host device 100 transmits the selected audio frame having the sequence number to the remote audio device. In FIG. 2, in embodiments where the remote audio device sends an acknowledgement to the host device for each audio frame transmitted, the controller waits for an acknowledgement at 230. The acknowledgement identifies the frames having the sequence number, thus enabling the controller to determine the delay associated with the corresponding audio frame. At 240, the controller stops the timer upon, or sometime after, receipt of the acknowledgment. At 250, the controller determines the transmission delay. The timer generally measures the round-trip delay of the audio frames having the sequence number. Depending upon when the timer is initiated, the timer may also measure transcoding delay, which is generally fixed for a particular frames size. These and other fixed delay may be subtracted from the timer period to permit accurate determination of the one-way transmission delay. The one-way transmission delay may also be added to local and/or to remote processing delays. The transmission delay alone or combined with other delay may be used to control the presentation of the video frames, for example, by delaying the presentation of the video frames. In some applications the transmission delay may vary as a result of variations in the channel. Thus in these and other applications the controller may track or measure the transmission delay periodically and make corresponding adjustments to the presentation of the video frame on the host device. In one implementation, the controller correlates the transmission delay associated with the audio frames to a number of video frames consumed. When the delay exceeds some threshold, the controller delays the transfer of video frames presented to the video player in a manner that synchronizes the audio and video frames. In one embodiment, the video frames are delayed by inserting null frames into the sequence of frames. In another embodiment, the video frames are delayed by repeating some or all of the video frames. The number of video frames that are repeated and or the repetition rate is generally dependent on the amount of delay that must be introduced.

In another embodiment, the controller determines the delay by comparing a number of video and audio frames consumed over a period of time. The controller may count the number of audio frames consumed by monitoring the rate at which the buffer entity transfers video frames to the video player during a specified interval. The controller may count the number of audio frames consumed by monitoring the acknowledgments received from the remote audio device during a specified time interval. In embodiments where sequence numbers are added to the audio and video frames, the controller may count the audio and video frames by monitoring the sequence numbers of the audio and video frames. The controller delays the transfer of video frames presented to the video player in a manner that synchronizes the audio and video frames when the delay exceeds a specified threshold.

In some embodiments, the controller delays the video frames for an estimated delay before determining the delay associated with transmitting the audio frames to the remote audio device. The estimated delay may be based upon one or more criteria. In one embodiment, the estimated delay is an estimate of the transmission delay between the host device and the remote audio device. In another embodiment, the estimated delay is an estimate of processing delay that occurs on the host device and/or processing delay that occurs on the remote device. In other embodiments, the estimated delay is an estimate of a combination of transmission delay and processing delay occurring on the host device and/or remote audio device. The estimated processing delay may be based for example on a particular type of transcoding. The estimated processing delay may also be based on a particular type of remote audio device, assuming that different devices have different processing delays. Thus, other than estimated transmission delays, the estimated processing delay may be based generally upon the capabilities of the remote audio device, since the capabilities of the remote audio device are indicative of the processing delay of the remote audio device and at least any transcoding delay that the host device must perform to accommodate the remote audio device. In one embodiment, the controller determines the estimated delay based upon delay information stored in a look-up table of the multimedia device. In implementations where the host device communicates with the remote audio device via Bluetooth, the host device may determine the remote audio device type upon linking the host device with the remote audio device. Thus in some applications, the remote audio device type may be used as a basis for selecting an estimated delay from a look-up table. FIG. 1 illustrates an estimated delay table 116 coupled to the controller 112.

Figure 3:
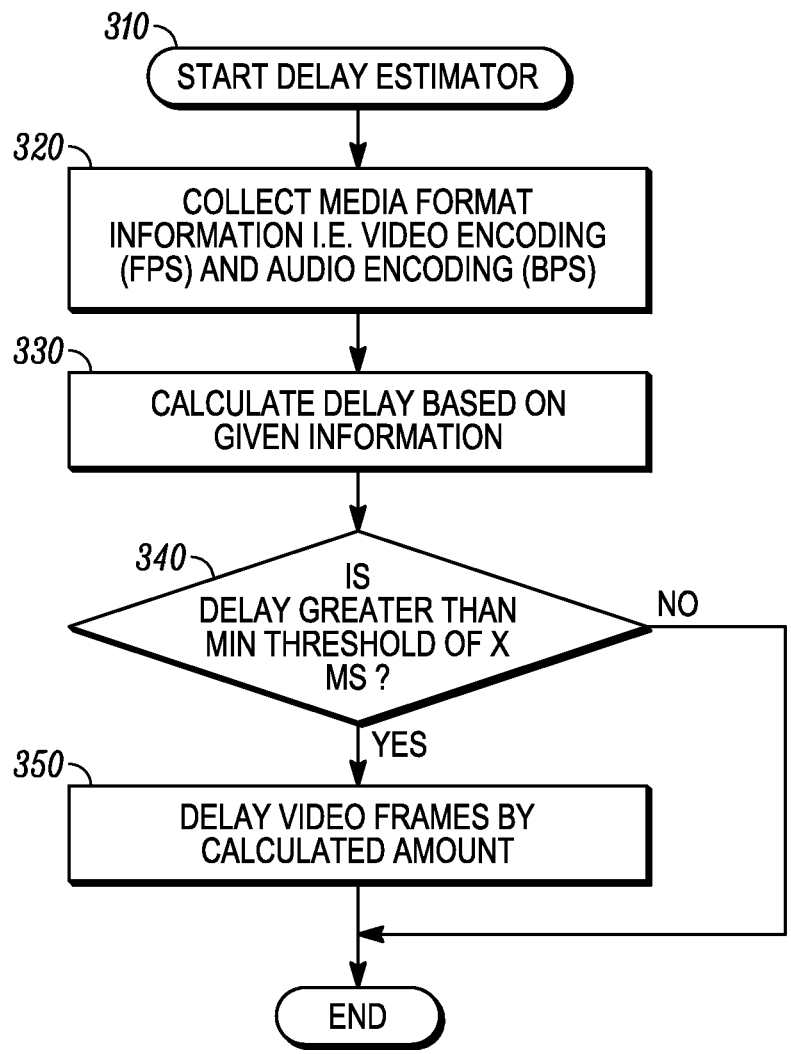
FIG. 3 is a process flow diagram for determining an estimated delay.

In FIG. 3, at 310, the controller begins the process of determining an estimated delay. This process may be initiated upon linking the host device with the remote audio device or upon some other event, preferably one that precedes that transmission of audio frames to the remote audio device. At 320, the controller obtained information that may form the basis for the estimated delay. The controller may then obtain estimated delay information from the look-up table. In other embodiments, the estimated delay is based on more than one estimated factor. For example, the controller may obtain remote audio device type information, media format information, etc. The controller may then obtain estimated delay information from the look-up table for each type of information. At 330, the controller computes the estimated delay, for example, by aggregating estimated delay information from the look-up table. At 340, the controller determines whether the computed estimated delay satisfies a condition, for example, is outside a specified time interval as discussed above. If the condition is satisfied, at 350, the controller 112 delays the presentation of the video frames based on the estimated delay via the video buffer and delay entity 114.

In some embodiments, illustrated in FIG. 1, the host device 100 includes an input 118 that permits the user to manually control or adjust synchronization. The manual synchronization input control may be used in combination with the synchronization control based on the estimated delay and/or measured delay.

Figure 4:
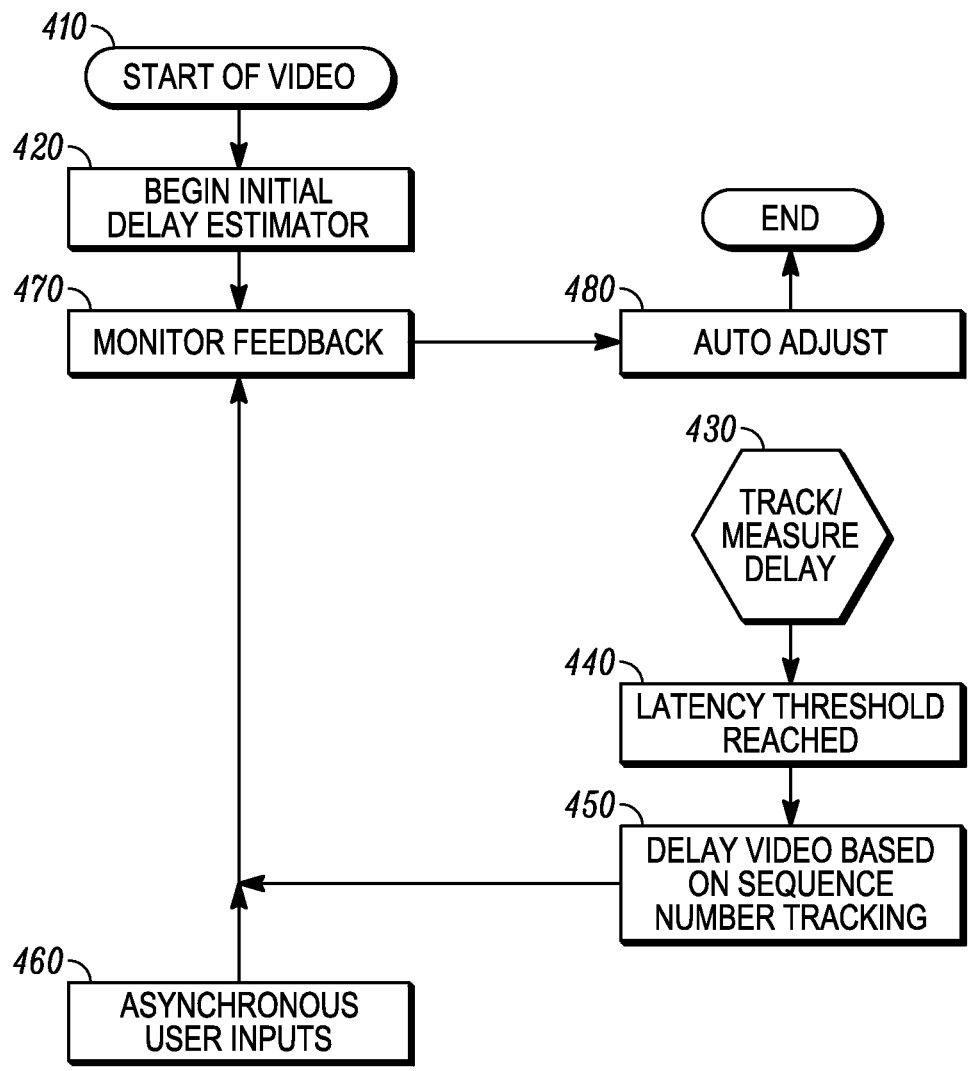
FIG. 4 is a process flow diagram for synchronizing audio and video frames.

FIG. 4 is a general process flow diagram for synchronizing audio and video frames. At 410, the process is initialized upon initializing video or upon linking with the remote audio device. At 420, the delay estimator is initialized. An exemplary delay estimator is discussed above in connection with FIG. 3. In FIG. 4, at 430, delay between the consumption of the audio and video frames is monitored as discussed above in connection with FIG. 2. At 440, a determination is made as to whether any delay between the presentation or consumption of the audio and video frames exceeds a latency threshold. This threshold is related to, and in some embodiments corresponds to, the specified time interval that defines whether or not the audio and video frames are synchronized. At 450, any adjustment to the presentation of the video frames required for synchronization is provided. At 460, any user generated manual control over the synchronization of the audio and video frames is provided. As suggested above, the user generated manual control of the audio and video synchronization may be independent of any control based on the estimated or measured delay. At 470, the controller monitors various controls to be applied to the presentation of the video frames. At 480, the controller controls the presentation of the video frames based on the feedback presented.

According to another aspect of the disclosure, the video frames and accompanying audio frames are synchronized by eliminating processing delay. The processing delay may be reduced in combination with or in lieu of delaying the presentation of video frames discussed above. In one embodiment, the multimedia device is compliant with a protocol that supports a mandatory audio encoding scheme. For example, some Bluetooth enabled multimedia devices are compliant with the Advanced Audio Distribution Profile (A2DP). To ensure interoperability of these Bluetooth devices, content in a native format on the Bluetooth multimedia device is transcoded to SBC in order to stream the audio frames using A2DP. If the remote audio device supports the native coding format on the host device, the content may be transmitted to the remote audio device without transcoding thereby eliminating the delay associated with transcoding. In the case of the exemplary Bluetooth multimedia device, the delay associated with SBC transcoding may be eliminated, assuming that the remote audio device supports the native format of the host Bluetooth multimedia device.

Figure 5:
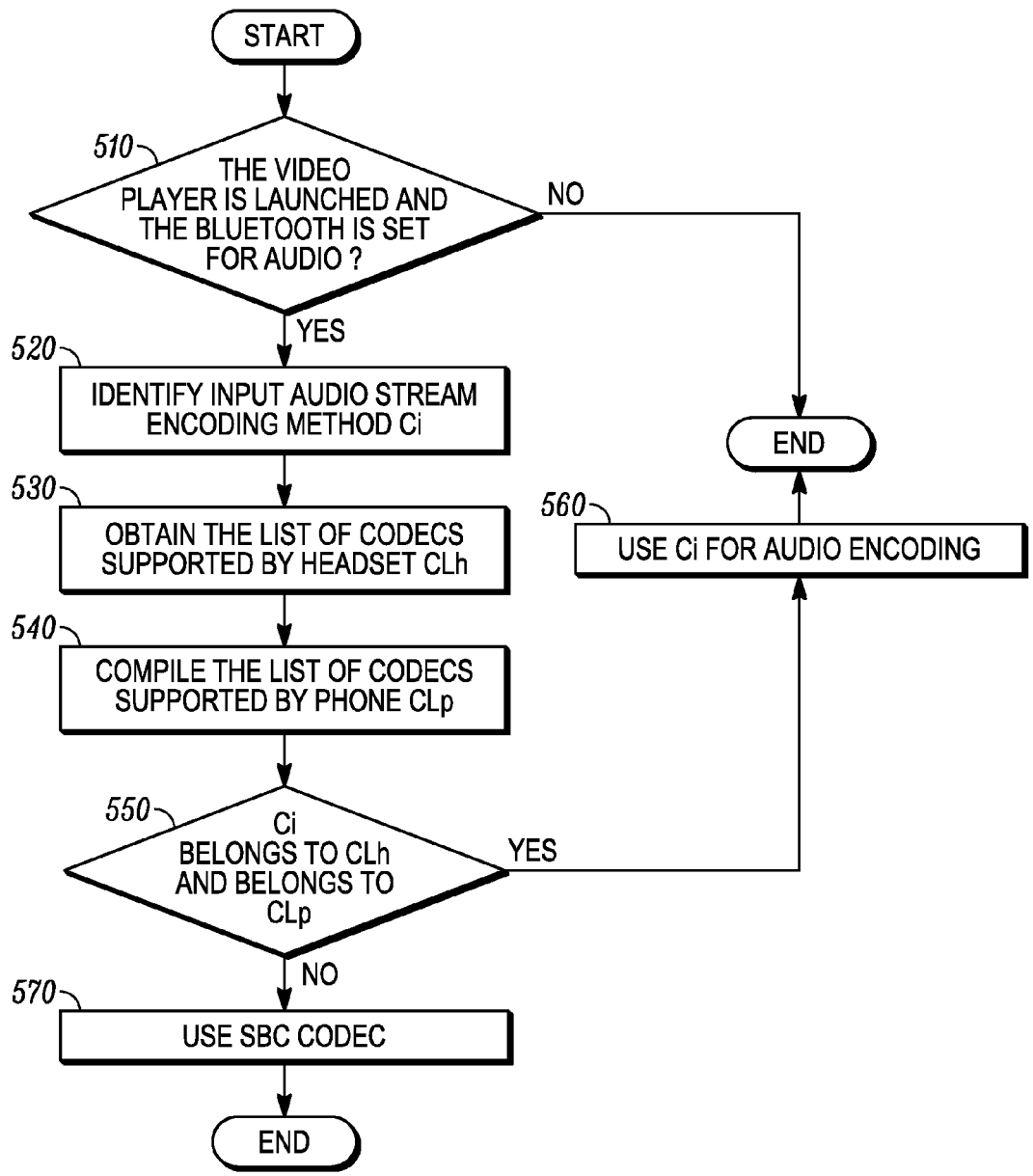
FIG. 5 is a process flow diagram for determining whether a remote audio device supports an audio format native to a host multimedia device.

FIG. 5 illustrates a process for determining whether a remote audio device supports an audio format native to the audio content on the multimedia device. The process may be executed by a processor, for example, the processor 112 in FIG. 1. At 510, a video player or application is launched on the host multimedia device, which is enabled for Bluetooth compliant communications with a remote audio device. At 520, the audio encoding format of the stream of audio frames is identified. This audio encoding format may or may not be supported by the host multimedia device. At 530, the audio format supported by the remote audio device is obtained. The one or more audio codecs supported by the remote audio device is obtained by the host device, for example, from a look-up table stored on the host device. Alternatively, the remote audio device may communicate this information to the host device, for example, upon linking the devices. At 540, the audio format supported by the host device is obtained. The one or more audio codecs supported by the host device may be obtained from a look-up table stored on the host device. At 550, a determination is made as to whether the audio format of the multimedia content is supported by both devices. If both the host and remote audio devices support the audio format of the audio content, at 560, the audio frames are transmitted to the remote device in the native format. Alternatively, if the both devices do not support the native format of the multimedia content, the content is transcoded into a format support by both devices. In FIG. 5 at 570, the audio contents is transcoded using the SBC codec.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a handheld multimedia device, the method comprising:
    separating multimedia content into audio frames and video frames;
    adding a sequence number to at least one of the audio frames and at least one of the video frames;
    presenting the video frames on a user interface of the multimedia device;
    transmitting the audio frames to a wireless audio device, which is separate from the multimedia device;
    measuring and tracking a transmission delay associated with the transmission of the audio frames to the wireless audio device;
    assessing the synchronization between the audio and video frames using the measured transmission delay through a correlation of the sequence numbers added to the audio and video frames; and
    controlling the presentation of the video frames on the user interface, to reduce or eliminate a lack of synchronization, by delaying a transfer of video frames presented to the multimedia device in a manner that synchronizes the audio and video frames when the measured transmission delay of the audio frames exceeds a specified threshold.

2. The method of claim 1, controlling the presentation of the video frames on the user interface by delaying the presentation of the video frames.

3. The method of claim 1,
    determining an estimated delay between the audio and video frames before determining the measured transmission delay associated with transmitting the audio frames to the wireless audio device,
    delaying the presentation of the video frames on the user interface of the multimedia device based upon the estimated delay before compensating for the measured transmission delay.

4. The method of claim 3, determining the estimated delay based upon estimated delay information stored in a look-up table of the multimedia device.

5. The method of claim 1,
    substantially reducing a processing delay of the multimedia device by obtaining a list of supported codecs on the wireless audio headset that do not require transcoding on the multimedia device;
    transmitting the audio frames in the native coding scheme rather than the mandatory encoding scheme only if the native coding scheme is supported by both the wireless audio device and by the multimedia device.

6. The method of claim 1,
    transmitting the audio frames to the wireless audio device for presentation on the wireless audio device,
    determining remote delay associated with processing audio frames on the wireless audio device,
    controlling the presentation of the video frames at the multimedia device based on the remote delay.

7. The method of claim 6,
    determining local delay associated with processing audio frames on the multimedia device,
    controlling the presentation of the video frames at the multimedia device based on the local delay.

8. The method of claim 1, determining the delay includes measuring a transmission time of the audio frames having the sequence number to the wireless audio device.

9. The method of claim 1, determining the delay based on a comparison of the number of video frames consumed to a number of audio frames consumed during a common time interval.

10. A multimedia device, comprising:
    a separating entity that separates a multimedia content into audio frames and video frames;
    a sequencing entity coupled to the separating entity, the sequencing entity that adds a sequence number to at least one audio frame and at least one video frame;
    a video player coupled to the separating entity, the video player that presents video frames received from the separating entity;
    a transceiver coupled to the sequencing entity, the transceiver that transmits audio frames to a wireless audio device, which is separate from the multimedia device;
    a controller coupled to the video player,
    the controller that measures and track a transmission delay associated with the audio frames being transmitted to the wireless audio device and assessing the synchronization between the audio and video frames using the measured transmission delay through a correlation of the sequence numbers added to the audio and video frames; and
    the controller that controls the presentation of the video frames at the video player and to reduce or eliminate a lack of synchronization, by delaying a transfer of video frames presented to the video player in a manner that synchronizes the audio and video frames when the measured transmission delay of the audio frames exceeds a specified threshold.

11. The device of claim 10, the controller that controls the presentation of the video frames on the video player by delaying the presentation.

12. The device of claim 10,
the controller that determines an estimated delay between the audio and video frames before measuring the transmission delay associated with transmitting the audio frames to the wireless audio device,
delaying the presentation of the video frames on the video player based upon the estimated delay before compensating for the measured transmission delay.

13. The device of claim 12,
a look-up table accessible by the controller, the look-up table storing estimated delay information,
the controller that determines the estimated delay for the wireless audio device using wireless audio device delay information stored in the look-up table.

14. The device of claim 10,
the controller that substantially reduces a processing delay of the multimedia device by obtaining a list of supported codecs on the wireless audio headset that do not require transcoding on the multimedia device;
the transmitter that transmits the audio frames in the native coding scheme rather than the mandatory encoding scheme only if the native coding schemes is supported by both the wireless audio device and by the multimedia device.

15. The device of claim 10,
the controller that determines a remote delay associated with processing audio frames on the wireless audio device,
the controller that controls the presentation of the video frames at the video player based on the remote delay.

16. The method of claim 15,
the controller that determines a local delay associated with processing audio frames on the multimedia device,
controlling the presentation of the video frames at the video player based on the local delay.

17. The device of claim 10, the multimedia device is a handheld electronics device.

18. The device of claim 10, the controller that determines the delay by measuring a transmission time of the audio frames having the sequence number to the wireless audio device.

19. The device of claim 10, the controller that determines the delay based on a comparison of a number of video and audio frames consumed during a common time interval.

* * * * *